(12) United States Patent
Huang

(10) Patent No.: US 10,348,879 B2
(45) Date of Patent: Jul. 9, 2019

(54) METHOD AND SYSTEM FOR PROCESSING PROMPT MESSAGE OF MOBILE TERMINAL BASED ON INTELLIGENT WEARABLE DEVICE

(71) Applicant: HUIZHOU TCL MOBILE COMMUNICATION CO., LTD., Huizhou (CN)

(72) Inventor: Yanliang Huang, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 15/306,470

(22) PCT Filed: Nov. 11, 2015

(86) PCT No.: PCT/CN2015/094308
§ 371 (c)(1),
(2) Date: Oct. 24, 2016

(87) PCT Pub. No.: WO2016/161805
PCT Pub. Date: Oct. 13, 2016

(65) Prior Publication Data
US 2017/0048372 A1 Feb. 16, 2017

(30) Foreign Application Priority Data
Apr. 8, 2015 (CN) .......................... 2015 1 0162447

(51) Int. Cl.
*H04M 1/725* (2006.01)
*H04M 3/533* (2006.01)
*H04M 3/537* (2006.01)

(52) U.S. Cl.
CPC ..... *H04M 1/7253* (2013.01); *H04M 1/72547* (2013.01); *H04M 3/53341* (2013.01); *H04M 3/537* (2013.01)

(58) Field of Classification Search
CPC ........... H04M 1/7253; H04M 1/72547; H04M 3/53341; H04M 1/725; H04M 3/533;
(Continued)

(56) References Cited

U.S. PATENT DOCUMENTS 9,774,997 B2 * 9/2017 Cui ....................... H04W 4/023
2013/0228753 A1 9/2013 Moon et al.
(Continued)

FOREIGN PATENT DOCUMENTS

CN 1710291 A 12/2005
CN 1956474 A 5/2007
(Continued)

*Primary Examiner* — Pablo N Tran
(74) *Attorney, Agent, or Firm* — Shimokaji IP

(57) ABSTRACT

A method for processing a prompt for an unread message of a mobile terminal using an intelligent wearable device may include: connecting the intelligent wearable device with the mobile terminal; setting a specified operation action on the intelligent wearable device to read the unread message of the mobile terminal; and controlling the mobile terminal to transmit the unread message to the intelligent wearable device for display when the intelligent wearable device receives the specified operation action as an input from a user.

12 Claims, 2 Drawing Sheets

(58) Field of Classification Search
CPC ...... H04M 3/5332; H04L 51/32; H04L 63/08; H04L 12/58; H04L 29/06; H04W 4/206; H04W 4/12; H04W 4/20
See application file for complete search history.

(56) References Cited

U.S. PATENT DOCUMENTS

| | | | | |
|---|---|---|---|---|
| 2014/0106677 | A1* | 4/2014 | Altman | H04B 1/3827 |
| | | | | 455/41.2 |
| 2015/0188861 | A1* | 7/2015 | Esplin | H04L 51/06 |
| | | | | 709/206 |
| 2015/0264731 | A1* | 9/2015 | Lin | H04L 67/26 |
| | | | | 455/41.2 |
| 2015/0301608 | A1* | 10/2015 | Nagaraju | G06F 3/0488 |
| | | | | 345/156 |
| 2016/0028869 | A1* | 1/2016 | Bhatt | H04M 1/7253 |
| | | | | 455/41.2 |
| 2016/0323234 | A1* | 11/2016 | Chen | H04W 4/12 |
| 2017/0185052 | A1* | 6/2017 | Wang | G04R 20/14 |

FOREIGN PATENT DOCUMENTS

| | | | |
|---|---|---|---|
| CN | 103472914 A | | 12/2013 |
| CN | 203490651 U | | 3/2014 |
| CN | 104218963 A | * | 12/2014 |
| CN | 104238940 A | | 12/2014 |
| CN | 104836904 A | | 8/2015 |

* cited by examiner

METHOD AND SYSTEM FOR PROCESSING PROMPT MESSAGE OF MOBILE TERMINAL BASED ON INTELLIGENT WEARABLE DEVICE

RELATED APPLICATIONS AND PRIORITY CLAIM

The present application is a national stage application of PCT/CN2015/094308, which claims the priority of Chinese patent application No. of 201510162447.3, dated Apr. 8, 2015, entitled Method and System for Processing Prompt Message of Mobile Terminal Based on Intelligent Wearable Device and submitted to the State Intellectual Property Office of the People's Republic of China on Apr. 8, 2015, and all contents of the Chinese patent application are hereby incorporated in the present application by reference.

TECHNICAL FIELD

The present disclosure relates to the technical field of mobile terminals. In particular, the present disclosure relates to a method and system for processing a prompt message of mobile terminal based on intelligent wearable device.

BACKGROUND

With the development of mobile communication and continuous improvement of people's living standards, various mobile terminals (such as mobile phones) have become more and more popular, and mobile phones have become an indispensable communication tool in people's daily lives.

As more and more functions are offered in mobile phones and users' pace of life becomes quicker, people are pursuing an efficient living style and also pursuing a perfect user experience on their intelligent mobile terminal devices.

However, when a mobile terminal user wants to check unread short messages, emails or missed calls or if they need to unlock their mobile phones (if protection password is set), it is inconvenient and/or unsuitable for them to do so when they are taking a bus, taking a subway or driving, in a meeting, in class, or in other unsuitable or inconvenient situations.

Therefore, there is a need to provide a more convenient and safe way to check for information on mobile terminal devices.

SUMMARY

In light of the deficiencies of the prior art, a method and system for processing prompt message of mobile terminal based on intelligent wearable device is described. Methods are described for processing unread prompt messages (such as unread short messages, emails, and missed calls) based on a mobile terminal.

A method for processing a prompt message for an unread message of a mobile terminal based on an intelligent wearable device includes:

connecting the intelligent wearable device with the mobile terminal;

setting a specified operation action on the intelligent wearable device to read the unread message of the mobile terminal;

displaying the prompt on the intelligent wearable device, wherein the prompt includes one of a short message, an email, and a contact information concerning a missed call; and controlling the mobile terminal to transmit the unread message to the intelligent wearable device for display when the intelligent wearable device receives the specified operation action as an input from a user.

In a further embodiment, a method for processing a prompt message for an unread message of a mobile terminal based on an intelligent wearable device includes the specified operation action comprising clicking a touch screen of the intelligent wearable device for a preset number of times.

In yet a further embodiment, a method for processing a prompt message for an unread message of a mobile terminal based on an intelligent wearable device includes:

wherein the displaying of the prompt further comprises the intelligent wearable device providing, according to the unread message, one of a vibration and a sound prompt.

In yet a further embodiment, a method for processing a prompt message for an unread message of a mobile terminal based on an intelligent wearable device includes:

setting a clicking of the contact information displayed on the intelligent wearable device to send a reply.

In yet a further embodiment, a method for processing a prompt message for an unread message of a mobile terminal based on an intelligent wearable device includes:

setting a clicking of the contact information displayed on the intelligent wearable device to automatically send a preset reply, wherein the contact information is a known contact of the mobile terminal.

In another embodiment, a method for processing a prompt message for an unread message of a mobile terminal based on an intelligent wearable device includes:

connecting the intelligent wearable device with the mobile terminal;

setting a specified operation action on the intelligent wearable device to read the unread message of the mobile terminal;

displaying the prompt on the intelligent wearable device; and controlling the mobile terminal to transmit the unread message to the intelligent wearable device for display when the intelligent wearable device receives the specified operation action as an input from a user.

In a further embodiment, a method for processing a prompt message for an unread message of a mobile terminal based on an intelligent wearable device includes:

wherein the connecting of the intelligent wearable device with a mobile terminal is through one of Bluetooth and WiFi.

In yet a further embodiment, a method for processing a prompt message for an unread message of a mobile terminal based on an intelligent wearable device includes:

wherein the specified operation action comprises:

clicking a touch screen of the intelligent wearable device for a preset number of times.

In yet a further embodiment, a method for processing a prompt message for an unread message of a mobile terminal based on an intelligent wearable device includes:

wherein the displaying of the prompt further comprises the intelligent wearable device providing, according to the unread message, one of a vibration and a sound prompt.

In yet a further embodiment, a method for processing a prompt message for an unread message of a mobile terminal based on an intelligent wearable device includes:

wherein the prompt includes one of a short message, an email and a contact information concerning a missed call.

In yet a further embodiment, a method for processing a prompt message for an unread message of a mobile terminal based on an intelligent wearable device includes:

wherein the prompt includes a contact information, and further comprising: setting a clicking of the contact information displayed on the intelligent wearable device to send a reply.

In yet a further embodiment, a method for processing a prompt message for an unread message of a mobile terminal based on an intelligent wearable device includes:

wherein the prompt includes a contact information, and further comprising:

setting a clicking of the contact information displayed on the intelligent wearable device to automatically send a preset reply, wherein the contact information is a known contact of the mobile terminal.

In another embodiment, a system for processing a prompt message for an unread message of a mobile terminal based on an intelligent wearable device includes:

a connection control module connecting the intelligent wearable device with the mobile terminal;

a first command setting module setting a specified operation action on the intelligent wearable device to read the unread message of the mobile terminal; and a display control module controlling the mobile terminal to transmit the unread message to the intelligent wearable device for display when the intelligent wearable device receives the specified operation action as an input from a user.

In a further embodiment, a system for processing a prompt message for an unread message of a mobile terminal based on an intelligent wearable device includes:

the connection control module connects the intelligent wearable device with the mobile terminal through one of Bluetooth and WiFi;

the specified operation action comprises clicking a touch screen of the intelligent wearable device for a preset number of times;

the display control module further displays the prompt on the intelligent wearable device; and the prompt includes one of a short message, an email, and a contact information concerning a missed call.

In yet a further embodiment, a system for processing a prompt message for an unread message of a mobile terminal based on an intelligent wearable device includes:

a second command setting module setting a clicking of the contact information displayed on the intelligent wearable device to send a reply; and a reply control module setting a clicking of the contact information displayed on the intelligent wearable device to automatically send a preset reply, wherein the contact information is a known contact of the mobile terminal.

With the method and system for processing a prompt message for an unread message of a mobile terminal based on an intelligent wearable device, a mobile terminal is provided with a new function: after the intelligent wearable device is connected with the mobile terminal, the intelligent wearable device can be subject to an appointed operation; unread short message, email, missed call and other unread information on the mobile terminal can be checked on the intelligent wearable device by using the appointed operation without having to unlock or operate the mobile terminal, thereby providing convenience and safety for users.

DETAILED DESCRIPTION

In order to make the purpose, technical solution and advantages of the invention more clear, the invention is described in detail below with reference to the accompanying figures and exemplary embodiments. It should be understood that exemplary embodiments are for illustrative purposes only. The exemplary embodiments are not intended to limit the scope of the claimed invention in any way.

Figure 1:
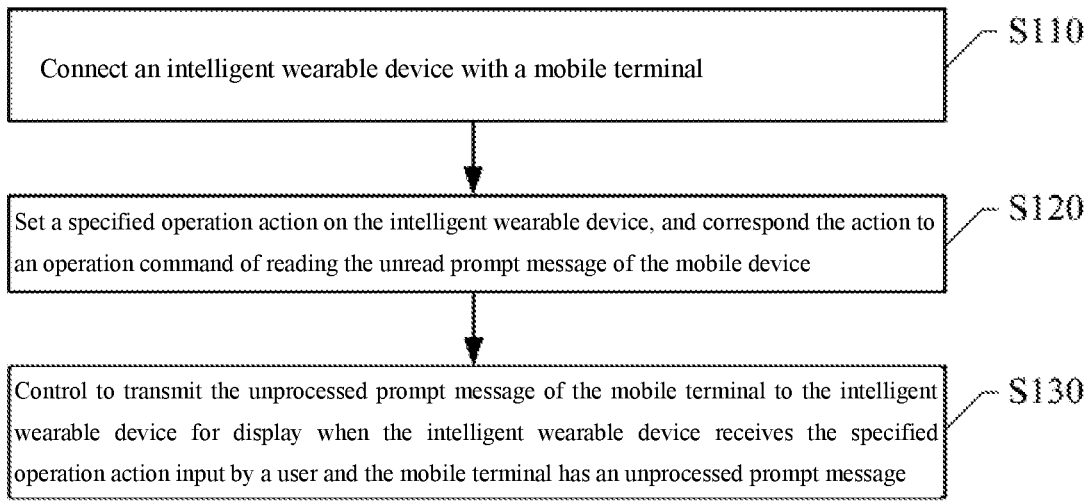
FIG. 1 depicts an exemplary flowchart of a method for processing a prompt for an unread message of a mobile terminal based on intelligent wearable device, according to an exemplary embodiment of the present invention.

Turning to FIG. 1, FIG. 1 depicts an exemplary flowchart of a method for processing a prompt for an unread message of a mobile terminal based on intelligent wearable device, according to an exemplary embodiment of the present invention. The method may include:

connecting an intelligent wearable device with a mobile terminal. (block S110)

In the example, an intelligent wearable device (such as wearable watch) is connected with a mobile terminal (such as mobile phone) through Bluetooth or WiFi firstly. For instance, a smart watch is connected with a mobile phone through Bluetooth or a WiFi hotspot.

The method may also include setting a specified operation action on the intelligent wearable device to read the unread message of the mobile terminal. (block S120)

In an example, the operation action is specified as clicking a touch screen for a preset number of times (such as twice or three times) on the intelligent wearable device (such as wearable watch) and corresponding the action to an operation command of reading an unread message of the mobile terminal. The unread message in the example may include a short message, an email and/or a contact information concerning a missed call. For example, an operation action of clicking a touch screen for two or three times is set to control automatic reading of an unread short message on the mobile terminal or phone.

The method may also include controlling the mobile terminal to transmit the unread message to the intelligent wearable device for display when the intelligent wearable device receives the specified operation action as an input from a user. (block S130)

For example, the intelligent wearable device may display a prompt for the unread message that is accompanied by a vibration and/or sound prompt according to the unread message.

Figure 2:
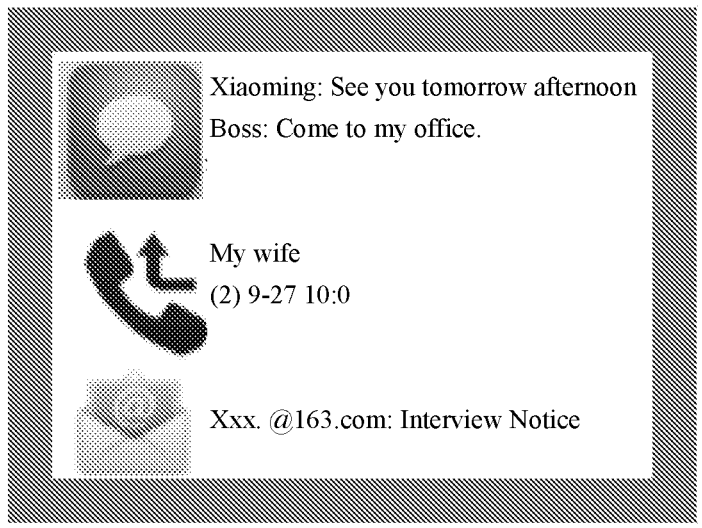
FIG. 2 depicts an exemplary operation interface diagram of a method for processing a prompt for an unread message of a mobile terminal based on intelligent wearable device, according to an exemplary embodiment of the present invention.

Thus, while driving or during some other busy process, the method may be conveniently triggered by clicking the touch screen on a wearable watch [e.g., clicking it for two or three times quickly] so as to display an unread short message, an email and a contact information concerning a missed call. For example, as shown in FIG. 2, when a user wants to check an unread short message, an email or a missed call on his/her mobile terminal, he/she operates the touch screen (e.g., clicks the touch screen for two or three times quickly) to control to transmission of the unread message of his/her mobile terminal to the intelligent wearable device for display. In such way, when the user wants to check the unprocessed or unread messages on the mobile terminal, he/she can check such messages through the intelligent wearable device by specifically clicking on the wearable device without inputting a password to unlock his/her mobile terminal, which facilitates users' operation and improves safety.

Another method is described below that is similar to the method described above in conjunction with FIG. 2, with the addition of:

After connecting a smart watch with a mobile phone through Bluetooth or a WiFi hotspot, setting on the intelligent wearable device, clicking a specified contact information displayed on the intelligent wearable device to send a reply.

Another method is described below that is similar to the method described above in conjunction with FIG. 2, with the addition of:

setting a clicking of the contact information displayed on the intelligent wearable device to automatically send a preset reply, wherein the contact information is a known contact of the mobile terminal.

For example, if the contact is specifically known to the mobile terminal, such as a family member [my wife or my husband] or a friend (see FIG. 2), the user may click on the specific contact on the watch so as to automatically send specific texts [such as, "I am in a meeting", "I am currently in class", or "I am currently driving"]. Thus, if a corresponding mechanism for a specific known contact is preset on the mobile phone (for example, if two calls from My Wife are missed, the user's wife may have something urgent to discuss with him, and he can click My Wife to automatically send some specific texts [such as in meeting, in class or driving] to inform his wife that he is currently occupied. In this manner, the user can have a streamlined experience in checking short messages and calls through the data interaction between the intelligent watch and intelligent mobile phone, which facilitates users' operation and improves safety.

Thus, a method for processing an unread message (such as an unread short message, an unread email and a missed call) of a mobile terminal based on an intelligent wearable device is provided.

Figure 3:
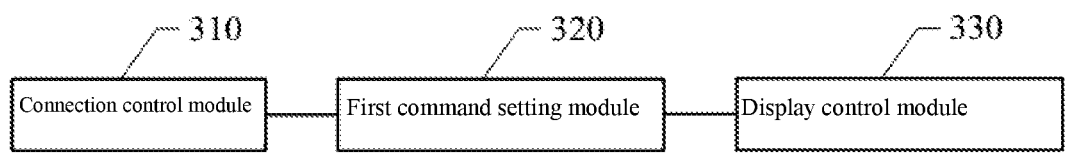
FIG. 3 depicts an exemplary functional block diagram of a method for processing a prompt for an unread message of a mobile terminal based on intelligent wearable device, according to an exemplary embodiment of the present invention.

A system for a prompt for an unread message of a mobile terminal based on an intelligent wearable device is also provided (see FIG. 3), which may include:

a connection control module 310 connecting the intelligent wearable device with the mobile terminal (see block S110 for details);

a first command setting module 320 setting a specified operation action on the intelligent wearable device to read the unread message of the mobile terminal (see block S120 for details); and a display control module 330 controlling the mobile terminal to transmit the unread message to the intelligent wearable device for display when the intelligent wearable device receives the specified operation action as an input from a user (see block S130 for details).

The system may be further configured such that:

the connection control module 310 connects the intelligent wearable device with the mobile terminal through one of Bluetooth and WiFi (see above for details);

the specified operation action comprises clicking a touch screen of the intelligent wearable device for a preset number of times (see above for details);

the display control module 330 further displays the prompt on the intelligent wearable device (see above for details);

a display control unit for controlling the intelligent wearable device to display the unread message (see above for details);

the prompt includes one of a short message, an email, and a contact information concerning a missed call.

The system may be further configured to include:

a second command setting module setting a clicking of the contact information displayed on the intelligent wearable device to send a reply (see above for details); and a reply control module setting a clicking of the contact information displayed on the intelligent wearable device to automatically send a preset reply, wherein the contact information is a known contact of the mobile terminal (see above for details).

In conclusion, with the above described method and system for processing a prompt for an unread message of mobile terminal based on intelligent wearable device, a mobile terminal is provided with a new function: after the intelligent wearable device is connected with the mobile terminal, the intelligent wearable device can be subject to appointed operation; to check an unread short message, an unread email, a missed call, and to check other unread information on the mobile terminal, which provides convenience and safe operation for users. It should be understood that the application of the present invention are not limited to the examples above. Those skilled in the art can improve or change the invention based on the descriptions above, and the improvement and changes shall fall within the protection scope of the appended claims.

What is claimed is:

1. A method for processing a prompt for a message of a mobile terminal based on an intelligent wearable device, wherein the method comprises:

connecting the intelligent wearable device with the mobile terminal;

displaying the prompt with corresponding contact information on a touch screen of the intelligent wearable device, wherein the prompt includes one of a short message, an email, and a missed call;

in response to a specified input to the intelligent wearable device by a user of the intelligent wearable device, displaying, via the touch screen, a message associated with the prompt, wherein the specified input does not include the selection of the contact information on the touch screen;

in response to the user selecting, via the touch screen, the contact information corresponding to the prompt, determining, via the intelligent wearable device, whether the contact information is for a contact specifically known to the mobile terminal, and if the contact information is for a contact specifically known by the mobile terminal, automatically sending a specific response for the specific contact, via at least the intelligent wearable device.

2. The method according to claim 1, wherein the specified input comprises:

clicking the touch screen of the intelligent wearable device for a preset number of times.

3. The method according to claim 1, further comprising: generating, via the intelligent wearable device, one of a vibration prompt and a sound prompt.

4. The method of claim 1, wherein the connecting of the intelligent wearable device with the mobile terminal is through one of Bluetooth and Wi-Fi.

5. A method for processing a prompt for a message of a mobile terminal using an intelligent wearable device, wherein the method comprises:
- connecting the intelligent wearable device with the mobile terminal;
- sending, via the mobile terminal, a prompt associated with the message to the intelligent wearable device for display as an image on a touch screen, wherein the display includes one of a short message, an email, a missed call, and a contact information therefor;
- in response to a first type input to the touch screen as it displays the image, providing, via the mobile terminal, the message to the intelligent wearable device for display; and;
- in response to a second type input to the touch screen as it displays the same image,
  - determining if the contact information is for a contact known to the mobile terminal, and
  - if the contact is known to the mobile terminal,
    - receiving, via the mobile terminal and from the intelligent wearable device, a specific response message for the known contact associated with the contact information, and
    - sending, via the mobile terminal, the specific response message to the known contact.

6. The method according to claim 5, wherein the connecting of the intelligent wearable device with the mobile terminal is through one of Bluetooth and Wi-Fi.

7. The method according to claim 5, wherein the first type input to the touch screen comprises:
- clicking a touch screen of the intelligent wearable device for a preset number of times.

8. The method according to claim 5, wherein the sending the prompt further comprises:
- sending one of a vibration prompt and a sound prompt.

9. A system for processing a prompt for a message of a mobile terminal based on an intelligent wearable device, wherein the intelligent wearable device comprises:
- a connection control module configured to connect the intelligent wearable device with the mobile terminal;
- a display control module configured to
  - display the prompt on a touch screen of the intelligent wearable device, wherein the prompt includes one of a short message, an email, and a missed call, and
  - display corresponding contact information proximate to the prompt;
- a display control unit configured to display a message associated with the prompt in response to the intelligent wearable device receiving a specified input from a user, the specified input not including selection of the contact information displayed on the touch screen;
- a reply control module configured to, in response to the contact information displayed on the touch screen being selected by the user,
  - determine whether the contact information is for a specific user known by the mobile terminal, and
  - if the contact information is for a specific user known by the mobile terminal, send, via at least the intelligent wearable device, a specific message to the specific user corresponding to the contact information.

10. The system according to claim 9, wherein the connection control module is configured to:
- connect the intelligent wearable device with the mobile terminal through one of Bluetooth and WiFi.

11. The system according to claim 9, wherein the specified input comprises clicking the touch screen of the intelligent wearable device for a preset number of times.

12. The system according to claim 9, wherein the intelligent wearable device is configured to:
- generate one of a vibration prompt and a sound prompt when displaying the prompt.

* * * * *